United States Patent
Zeng et al.

(10) Patent No.: US 11,328,521 B2
(45) Date of Patent: May 10, 2022

(54) MAP CONSTRUCTION METHOD, ELECTRONIC DEVICE AND READABLE STORAGE MEDIUM

(71) Applicant: Beijing Horizon Robotics Technology Research and Development Co., Ltd., Beijing (CN)

(72) Inventors: Siyu Zeng, Beijing (CN); Degang Yang, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 161 days.

(21) Appl. No.: 16/808,780

(22) Filed: Mar. 4, 2020

(65) Prior Publication Data

US 2020/0293751 A1    Sep. 17, 2020

(30) Foreign Application Priority Data

Mar. 11, 2019 (CN) .......................... 201910182305.1

(51) Int. Cl.
*G06K 9/00* (2022.01)
*G06V 20/64* (2022.01)
(Continued)

(52) U.S. Cl.
CPC ............. *G06V 20/64* (2022.01); *G01C 21/20* (2013.01); *G06K 9/629* (2013.01); *G06K 9/6232* (2013.01); *G06V 20/10* (2022.01); *G06V 2201/07* (2022.01)

(58) Field of Classification Search
None
See application file for complete search history.

(56) References Cited

U.S. PATENT DOCUMENTS 8,744,744 B2 *  6/2014  Takagi ................. G01S 13/931
                                                     701/301
9,008,998 B2 *  4/2015  Canter ................... G06T 7/521
                                                     702/150

(Continued)

FOREIGN PATENT DOCUMENTS

JP    2018132925 A  *  8/2018
JP    2018132925 A     8/2018
KR  1020180041176 A    4/2018

OTHER PUBLICATIONS

First Office Action issued in counterpart Korean Patent Application No. 10-2020-0029275, dated Apr. 28, 2021.

*Primary Examiner* — Feng Niu
(74) *Attorney, Agent, or Firm* — Westbridge IP LLC (57) ABSTRACT

A map construction method, an electronic device and a readable storage medium are disclosed. The map construction method includes: obtaining three-dimensional point cloud data corresponding to observed objects in current target frame data, the observed objects including a feature object and a non-feature object; obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to a preset value, to construct a map according to the feature parameter and the three-dimensional point cloud data of which the point cloud density is adjusted.

20 Claims, 2 Drawing Sheets

(51) Int. Cl.
*G06K 9/62* (2022.01)
*G01C 21/20* (2006.01)
*G06V 20/10* (2022.01)

(56) References Cited

U.S. PATENT DOCUMENTS

| | | | | |
|---|---|---|---|---|
| 10,223,829 | B2* | 3/2019 | Wu | G06T 7/344 |
| 10,628,712 | B2* | 4/2020 | Jiang | G06F 16/29 |
| 10,854,011 | B2* | 12/2020 | Tay | G05D 1/0088 |
| 10,878,621 | B2* | 12/2020 | Zhou | G01C 21/20 |
| 11,087,474 | B2* | 8/2021 | Yan | G06T 7/246 |
| 2009/0273601 | A1* | 11/2009 | Kim | G01C 21/3638 |
| | | | | 345/419 |
| 2011/0282622 | A1* | 11/2011 | Canter | G06K 9/00691 |
| | | | | 702/150 |
| 2018/0158235 | A1* | 6/2018 | Wu | G06T 19/20 |
| 2018/0253625 | A1* | 9/2018 | Jiang | G01C 21/32 |
| 2019/0206124 | A1* | 7/2019 | Zhou | G01C 21/005 |
| 2019/0311546 | A1* | 10/2019 | Tay | G06T 19/006 |
| 2020/0074641 | A1* | 3/2020 | Yan | G06T 7/11 |
| 2020/0081096 | A1* | 3/2020 | Chen | G01S 17/931 |
| 2020/0182626 | A1* | 6/2020 | He | G01S 17/89 |
| 2020/0346750 | A1* | 11/2020 | Hu | G06K 9/0063 |
| 2021/0027477 | A1* | 1/2021 | Huber | G06T 7/35 |

* cited by examiner

MAP CONSTRUCTION METHOD, ELECTRONIC DEVICE AND READABLE STORAGE MEDIUM

CROSS-REFERENCE TO RELATED APPLICATIONS

The present application claims priority to Chinese patent application No. 201910182305.1, filed on Mar. 11, 2019, all contents of which are incorporated herein in its entirety by reference.

TECHNICAL FIELD

The present application relates to the technical field of map construction, and more particularly to a map construction method, an electronic device and a readable storage medium.

BACKGROUND

With the development of science and technology, a mobile device with an autonomous navigation capability such as a self-driving vehicle or a robot becomes a research hotspot. When the mobile device enters an unknown working environment, a map of surrounding environment may be constructed based on environment data collected by a sensor mounted on the devices, thereby obtaining locations of the devices in space. Therefore, map construction is crucial to achieving autonomous navigation. However, an existing map construction method needs to be customized according to the category of the sensor, that is, it is only adapted for a specific type of sensor and exhibits a lower adaptability.

SUMMARY

The present application is provided to solve the above technical problems. Embodiments of the present application provide a map construction method, an electronic device and a readable storage medium, which realize a homogenization processing of data by extracting a feature parameter of a feature object and adjusting a point cloud density of a non-feature object, so that a map constructed may provide a positioning solution for different sensors without being limited to the categories of the sensors.

According to an aspect of the present application, there is provided a map construction method, including: obtaining three-dimensional point cloud data corresponding to observed objects in current target frame data, the observed objects including a feature object and a non-feature object; obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to a preset value, to construct a map according to the feature parameter and the three-dimensional point cloud data of which the point cloud density is adjusted.

According to another aspect of the present application, there is provided an electronic device, including: a processor; and a memory for storing instructions executable by the processor. The processor is configured to perform a map construction method, including: obtaining three-dimensional point cloud data corresponding to observed objects in current target frame data, the observed objects including a feature object and a non-feature object; obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to a preset value, to construct a map according to the feature parameter and the three-dimensional point cloud data of which the point cloud density is adjusted.

According to a further aspect of the present application, there is provided a computer readable medium storing a computer program configured to perform a map construction method, including: obtaining three-dimensional point cloud data corresponding to observed objects in current target frame data, the observed objects comprising a feature object and a non-feature object; obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to a preset value, to construct a map according to the feature parameter and the three-dimensional point cloud data of which the point cloud density is adjusted.

Compared with the prior art, according to the map construction method, the device and the readable storage medium of the present application, the three-dimensional point cloud data corresponding to the feature object and the non-feature object in the current target frame data may be obtained, then the feature parameter corresponding to the feature object is obtained based on the three-dimensional point cloud data corresponding to the feature object, and then the point cloud density of the three-dimensional point cloud data corresponding to the non-feature object is adjusted to the preset value, to construct the map according to the feature parameter and the three-dimensional point cloud data of which the point cloud density is adjusted.

In this way, the map construction method, the device and the readable storage medium of the present application realize a homogenization processing of data by the feature parameter and three-dimensional point cloud data with an unified density, and the map constructed according to data after the homogenization processing may provide a positioning solution for different sensors without being limited to categories of the sensors.

BRIEF DESCRIPTION OF DRAWINGS

The above and other objects, features and advantages of the present application will become more apparent by describing embodiments of the present application in more detail combined with accompanying drawings. The accompanying drawings are configured to provide a further understanding of the embodiments of the present application, constitute a part of the specification to explain the present application together with the embodiments of the present application, and do not constitute a limitation of the present application. In the accompanying drawings, the same reference signs usually represent the same components or steps.

DETAILED DESCRIPTION OF EMBODIMENTS

Hereafter, exemplary embodiments according to the present application will be described in detail with reference to the accompanying drawings. Obviously, the described embodiments are merely a part but not all of the present application. It should be understood that the present application is not limited by the exemplary embodiments described herein.

Brief Introduction of the Present Application

As described above, in the map construction method, a map of surrounding environment is constructed based on environment data collected by a sensor mounted on a mobile device having an autonomous navigation capability such as a self-driving vehicle, a robot, and the like.

Existing map construction solutions are mainly classified into two categories: one is vSLAM (Visual Simultaneous Location and Mapping), that is, a map is constructed by using the environment data collected by a vision sensor such as a camera; the other is SLAM based on radar, that is, a map is constructed by using the environment data collected by a lidar. Since sensors used are different, raw data obtained is different, and therefore, the constructed maps are very unlikely to be used interchangeably, are only adapted for specific types sensors and exhibit a lower adaptability.

Based on the above technical problem, a basic concept of the present application is to implement a homogenization of data from different sources by pre-processing target frame data collected by a sensor. On the one hand, a feature object in the target frame data is expressed at a higher level by extracting a feature parameter of the feature object, and on the other hand, a point cloud density of three-dimensional point cloud data corresponding to a non-feature object which cannot be expressed by the feature parameter is unified.

Specifically, in the map construction method, the device and the readable storage medium according to the present application, three-dimensional point cloud data corresponding to observed objects in current target frame data is obtained firstly, the observed objects including a feature object and a non-feature object, then a feature parameter corresponding to the feature object based on three-dimensional point cloud data corresponding to the feature object is obtained, the feature parameter being used to indicate a position and a size of the feature object, and a point cloud density of three-dimensional point cloud data corresponding to the non-feature object is adjusted to a preset value finally.

In this way, the homogenization of heterogeneous data collected by different categories of sensors may be achieved by extracting the feature parameter of the feature object and adjusting the point cloud density of the point cloud data of the non-feature object, so that the present method may be applied to map construction and positioning of different sensors without being limited to the categories of sensors.

Having introduced basic principles of the present application, various non-limiting embodiments of the present application are introduced below in detail with reference to the accompanying drawings.

Exemplary Methods

Figure 1:
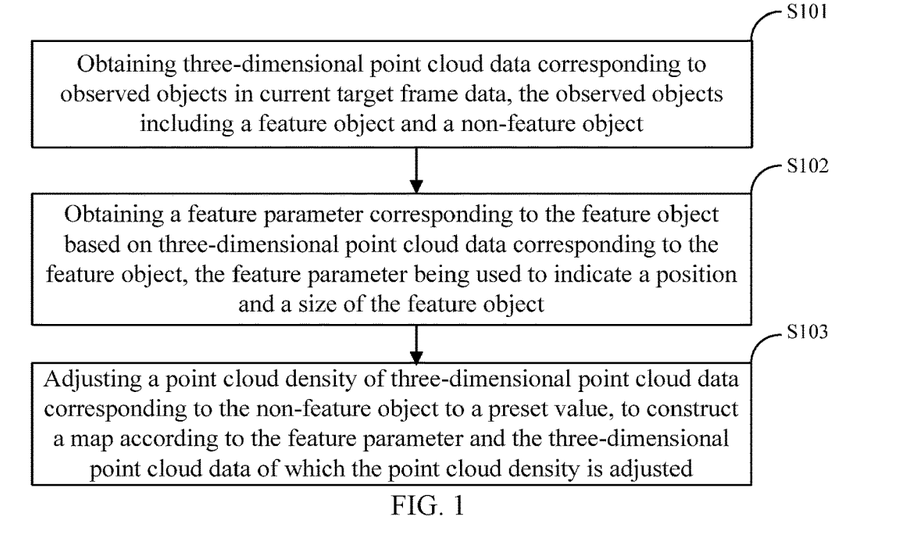
FIG. 1 is a flowchart of a map construction method according to an exemplary embodiment of the present application.

FIG. 1 is a flowchart of a map construction method according to an exemplary embodiment of the present application. The present embodiment may be applied to a mobile device. As shown in FIG. 1, the method includes the following steps.

Step S101: obtaining three-dimensional point cloud data corresponding to observed objects in current target frame data, the observed objects including a feature object and a non-feature object.

A mobile device such as a self-driving vehicle, a robot, and the like is provided with a sensing sensor such as a lidar, a millimeter wave radar, a camera or the like to collect sensing data for constructing a map. While the mobile device moves, the sensing sensor collects sensing data constantly. In the present embodiment, target frame data is extracted from the sensing data collected by the sensing sensor, the target frame data extracted successively is regarded as the current target frame data sequentially, and processing of step S101 to step S103 is performed for the current target frame data to construct an environment map.

In the present embodiment, the target frame data may be extracted according to actual needs. For example, in the sensing data collected constantly by the sensing sensor, a frame may be selected as the target frame data at an interval of a preset number of frames. The interval of the preset number of frames may be set according to actual needs. Alternatively, each frame of data collected by the sensing sensor may be regarded as the target frame data.

It may be understood that a data source category of the current target frame data is determined by the sensing sensor adopted by the mobile device in an actual application scenario. For example, if the sensing sensor for constructing a map and positioning on the mobile device adopts a camera, target image frame data collected currently by the camera is regarded as the current target frame data sequentially; if the sensing sensor for constructing a map and positioning on the mobile device adopts a lidar, target frame laser point cloud data collected currently by the lidar is regarded as the current target frame data sequentially; and if the sensing sensor for constructing a map and positioning on the mobile device adopts a camera and a lidar, the target image frame data collected currently by the camera and the target frame laser point cloud data collected currently by the lidar are together regarded as the current target frame data.

The current target frame data includes information of objects observed by the sensing sensor in the mobile device from the surrounding environment. In the present embodiment, the objects that may be observed from the environment, that is, observed objects, may be classified into a feature object and a non-feature object. The feature object is an object which is regular in shape and may be structured in the environment, such as a lane line, a pillar, a regular-shaped road sign, and the like. The non-feature object is an object which is diverse and irregular in shape and thus cannot be structured, such as a tall building, a tree, a pedestrian, and the like.

Step S102: obtaining a feature parameter corresponding to the feature object based on three-dimensional point cloud data corresponding to the feature object, the feature parameter being used to indicate a position and a size of the feature object.

Unlike the three-dimensional point cloud data, the feature parameter is an expression of the position and structure of the feature object in a higher dimension, and the position and structural size of the feature object in the environment may be restored by the feature parameter. For example, the feature object is a cylindrical object such as a pillar, a feature coordinate of the cylindrical object such as a starting point coordinate, a bottom surface radius and a height may be regarded as feature parameters of the cylindrical object. The feature point coordinate is used to define the position of the feature object, and the bottom surface radius and the height are used to define the size of the feature object. For another example, the feature object is a square object such as a square signal indication sign, a vertex coordinate of the square object may be regarded as a feature parameter of the square object.

In the present embodiment, the feature object in the current target frame data is expressed by the feature parameter, which may not only realize a homogenization of heterogeneous data collected by different categories of sensors, but also compress the amount of data for constructing a map effectively.

Step S103: adjusting a point cloud density of three-dimensional point cloud data corresponding to the non-feature object to a preset value, to construct a map according to the feature parameter and the three-dimensional point cloud data of which the point cloud density is adjusted.

It may be understood that a non-feature object that may not be expressed by the feature parameter such as a flower, a house, and the like, may also exist in the current target frame data, in addition to the feature object which is regular in shape and may be expressed by the feature parameter. A density of data obtained by different sensing sensors is inconsistent, for example, image data is the densest, and the density of the point cloud obtained in the laser point cloud data also varies with the number of lines. Therefore, the present embodiment further adjusts the point cloud density of the three-dimensional point cloud data corresponding to the non-feature object in the current target frame data, that is, the point cloud density of the three-dimensional point cloud data corresponding to the non-feature object is adjusted to a preset value, so that no matter which category of sensing sensor the current target frame data is derived from, the point cloud density of the three-dimensional point cloud data corresponding to the non-feature object is as uniform as possible, a homogenization of this portion of data is achieved, which is beneficial to make a positioning solution applicable to the constructed map without being limited by the categories of sensing sensors.

Specifically speaking, in the step S103, the preset value may be set according to the point cloud density of the three-dimensional point cloud data corresponding to data collected by various sensing sensors in practical application, for example, it may be set to 1 $cm^3$/point, 3 $cm^3$/point or 5 $cm^3$/point in a three-dimensional space. In the present embodiment, the point cloud density of the three-dimensional point cloud data corresponding to the non-feature object may be adjusted to the preset value by downsampling the three-dimensional point cloud data corresponding to the non-feature object in the current target frame data.

As an optional implementation, in the present embodiment, the three-dimensional point cloud data may be denoised firstly before a downsampling process to remove noise points and outliers entrained in the point cloud data to improve reliability of a processing result.

For the current target frame data, after performing the steps S101 to S103, the feature parameter corresponding to the feature object and the three-dimensional point cloud data after resolution unification corresponding to the non-feature object in the current target frame data may be obtained, and then the map may be constructed by using the feature parameter and three-dimensional point cloud data obtained.

It may be understood that a partial map corresponding to the current target frame data may be constructed based on the feature parameter and the three-dimensional point cloud data after the resolution unification corresponding to the current target frame data, and it is necessary to further splice feature parameters and three-dimensional point cloud data after the resolution unification corresponding to all target frame data collected by the sensing sensor during a moving process of the mobile device, to construct a whole map corresponding to the whole moving process of the mobile device.

Specifically speaking, on the basis of the embodiment shown in FIG. 1, a manner of obtaining the three-dimensional point cloud data corresponding to the observed objects in the current target frame data may be set according to a data category of the current target frame data. For example, for image data, three-dimensional point cloud data having real dimensions and corresponding to the image may be obtained in a manner of depth estimation, stereo matching, or the like. Furthermore, in order to distinguish three-dimensional point cloud data corresponding to each object in the image, tag information corresponding to each point, that is, an object category corresponding to each point, such as a lane line or a pillar, needs to be obtained. As an implementation, semantic segmentation may be performed for the image to obtain the tag information corresponding to each pixel point, and the obtained tag information is mapped into the three-dimensional point cloud. In this way, the three-dimensional point cloud data carrying the tag information and corresponding to the image data may be obtained. For lidar data, the point cloud may be classified by a random forest classifier. Alternatively, when the current target frame data includes image data as well as lidar data, the laser point cloud may be projected onto the image which has already obtained semantic information, thereby tagging the tag information to the three-dimensional point cloud data corresponding to the lidar data.

On this basis, the three-dimensional point cloud data is classified according to the tag information corresponding to each point in the three-dimensional point cloud data to obtain point cloud sets corresponding to different categories of objects, for example, a point cloud set corresponding to a lane line, a point cloud set corresponding to a tree and a point cloud set corresponding to a pillar are obtained respectively. Since a point cloud set corresponding to a same category of objects may include a plurality of objects, for example, a pillar point cloud set may include a plurality of pillar point cloud sets, therefore, it is necessary to further perform a cluster analysis for the point cloud set corresponding to the same category of objects to obtain a point cloud set corresponding to a single object. For example, the point cloud set corresponding to the same category of objects may be clustered by a manner of clustering with Euclidean distance, according to three-dimensional coordinate information of each point in the point cloud set corresponding to the same category of objects, to obtain the point cloud set corresponding to a single object in the category. In this way, a category and a corresponding point cloud set of each object in the current target frame data may be obtained after finishing clustering the point cloud set corresponding to each category of objects. Furthermore, the feature object and the non-feature object in the current target frame data may be identified based on a category of each object in the current target frame data.

Specifically speaking, a process of identifying the feature object and the non-feature object in the current target frame data may include: determining a category of each object in the current target frame data; matching the category of the object with an object category in a preset category information base, determining a successfully-matched object as the feature object, and determining an unsuccessfully-matched object as the non-feature object. The category information base stores multiple object categories, which may be specifically set according to existing objects that may be structured in the environment. That is to say, for each object in the current target frame data, if the category of the object is a category stored in the category information base, the object is a feature object, and if the category of the object is not a category stored in the category information base, the object is a non-feature object.

Alternatively, a category table may be preset, and the category table includes object categories that are common in the environment, such as a lane line, a pillar, a sign, a tall building, a tree, a pedestrian and other categories. Objects that may be structured in the category table, such as a lane line, a pillar, a sign and the like, may be pre-marked. After determining a category of each object in the current target frame data, it may be found in the category table whether the category is marked, and if so, the object is determined to be a feature object, and if the category is not found in the category table or the category is found but the category is not marked, the object is determined to be a non-feature object. Certainly, in addition to the above implementation, the feature object and the non-feature object in the current target frame data may be identified in other manners, which is not limited herein.

After identifying the feature object and the non-feature object corresponding to the current target frame data, the feature parameter may be extracted based on the three-dimensional point cloud data corresponding to the feature object, and the point cloud density may be adjusted for the three-dimensional point cloud data corresponding to the non-feature object.

Figure 2:
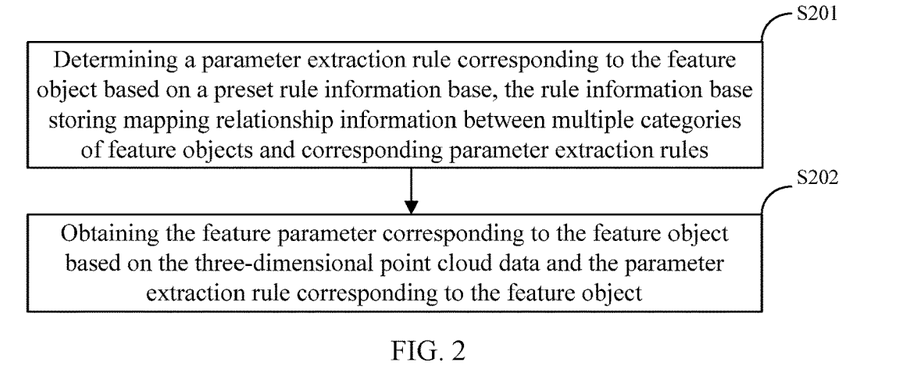
FIG. 2 is a schematic flowchart of a process for obtaining a feature parameter according to an exemplary embodiment of the present application.

As shown in FIG. 2, on the basis of the embodiment shown in FIG. 1, as an optional implementation of the present embodiment, the step S102 may include the following steps.

Step S201: determining a parameter extraction rule corresponding to the feature object based on a preset rule information base, the rule information base storing mapping relationship information between multiple categories of feature objects and corresponding parameter extraction rules.

Specifically speaking, the parameter extraction rules corresponding to different categories of feature objects may be different. The parameter extraction rules are used to obtain feature parameters corresponding to the feature objects based on the three-dimensional point cloud data corresponding to the feature objects. Based on feature objects that may exist in the environment, the parameter extraction rules are pre-established for existing feature objects, and category identifiers of the feature objects, the established parameter extraction rules and the mapping relationship information between the category identifiers of the feature objects and corresponding parameter extraction rules may be stored in the preset rule information base. Specifically, a category identifier of a feature object may be a name of the feature object or a pre-defined unique identification code for characterizing the category of the feature object.

Step S202: obtaining the feature parameter corresponding to the feature object based on the three-dimensional point cloud data and the parameter extraction rule corresponding to the feature object.

As an optional implementation, a feature object whose point cloud arrangement has a specific law may be expressed by a corresponding structured expression, and its corresponding parameter extraction rule may include: determining a structured expression corresponding to the feature object; based on the three-dimensional point cloud data corresponding to the feature object, performing parameter fitting for the structured expression corresponding to the feature object to obtain a structured parameter corresponding to the feature object, and then obtaining the feature parameter corresponding to the feature object based on the obtained structured parameter. Certainly, feature objects whose point cloud arrangements conform to different laws correspond to different structured expressions. Therefore, the structured expression corresponding to the feature object may be determined based on the category of the feature object.

Specifically speaking, obtaining the feature parameter corresponding to the feature object based on the obtained structured parameter may include: obtaining a position parameter of the feature object according to the three-dimensional point cloud data corresponding to the feature object, the position parameter being used to indicate a position of the feature object; and regarding the structured parameter and the position parameter as the feature parameter corresponding to the feature object.

Take a lane line as an example, it may be expressed by a cubic curve equation. It is assumed that in a point cloud set corresponding to the lane line, a starting point is $P_1(x_1, y_1, z_1)$, and a finishing point is $P_2(x_2, y_2, z_2)$. If $P(x, y, z)$ is any point between $P_1$ and $P_2$, a length of an arc from P to $P_1$ is "arc", then $x=fx_1(arc)$, $y=fx_2(arc)$ and $z=fx_3(arc)$. An expression of $fx_i(arc)$ is: $A_i\ arc^3 + B_i\ arc^2 + C_i\ arc + D_i$. Structured parameters $A_i$, $B_i$, $C_i$ and $D_i$ corresponding to the lane line may be obtained by performing parameter fitting for the expression based on three-dimensional point cloud data corresponding to the lane line, and i takes 1, 2 and 3. In order to indicate a position and a structure of the lane line, the starting point coordinate, the finishing point coordinate and the structured parameter of the lane line, that is, $\{x_1, y_1, z_1, x_2, y_2, z_2, A_i, B_i, C_i, \text{and } D_i\}$, may be together regarded as the feature parameter corresponding to the lane line.

As an optional implementation, a feature object with a regular shape may be expressed by a specific structure, and its corresponding parameter extraction rule may include: determining a structure category for characterizing the feature object, for example, the structure category may include, but not limited to, a cylinder, a sphere, a cuboid, a cube, and the like; obtaining a structural feature value corresponding to the feature object based on the three-dimensional point cloud data and the structure category corresponding to the feature object, for example, a structural feature value corresponding to a feature object characterized by a cylinder may be a bottom surface radius and height of the cylinder, and a structural feature value corresponding to a feature object characterized by a sphere may be a spherical radius; and obtaining the feature parameter corresponding to the feature object based on the structural feature value corresponding to the feature object.

For example, take a pillar as an example. It may be expressed by a cylinder. Six degree-of-freedom coordinates $(x_0, y_0, z_0, r, p, q)$ of a starting point of the pillar may be obtained based on three-dimensional point cloud data corresponding to the pillar, to express its position and orientation. The six degree-of-freedom coordinates of the starting point are regard as a position parameter corresponding to the pillar. In addition, structural feature values of the cylinder for characterizing the pillar, that is, the height h and the bottom surface radius r of the cylinder, are obtained based on three-dimensional point cloud data corresponding to the pillar, and then the coordinates of the starting point and the structural feature values, that is, $(x_0, y_0, z_0, r, p, q, h, r)$ are together regarded as a feature parameter corresponding to the pillar.

On the basis of the embodiment shown in FIG. 1, the adjusting a point cloud density of three-dimensional point cloud data corresponding to the non-feature object in the current target frame data to a preset value may include: downsampling the three-dimensional point cloud data corresponding to the non-feature object in the current target frame data by a preset voxel grid, and adjusting the point cloud density of the three-dimensional point cloud data corresponding to the non-feature object to the preset value to unify resolution of the three-dimensional point cloud data corresponding to the non-feature object. The three-dimensional point cloud data of which the point cloud density is adjusted may be evenly distributed by the voxel grid, which is beneficial to obtain a more precise map construction result.

Specifically speaking, a three-dimensional voxel grid may be created according to the point cloud data, then the three-dimensional voxel grid is divided into m×n×l small grids according to a preset size of a side length l of small cubic grids to be divided. After the grids are divided, the point cloud data is placed in corresponding small grids, a small grid without a data point is deleted, a distribution of the point cloud data in the small grids is counted, a positional relationship between the data point in each small grid and a center of gravity of corresponding small grid is obtained, and then data point need to be retained is filtered based on the positional relationship. For example, a center of gravity of all data points in a small grid may approximately represent other data points in the small grid, that is, all points in the small grid is represented by one point of center of gravity, and point cloud data after downsampling may be obtained after all small grids are processed. Alternatively, a data point closest to the center of gravity in each small grid may be retained, and other data points are deleted. In the above process, the side length l of the small cubic grids may be set according to actual needs. The side length l of the small cubic grids are inversely proportional to the point cloud density of the point cloud data obtained after downsampling. The larger the side length l, the smaller the point cloud density of the point cloud data obtained after downsampling.

It needs to be noted that in the present embodiment, in addition to the voxel grid, the three-dimensional point cloud data corresponding to the non-feature object may be downsampled by other downsampling manners, and it will not be limited herein.

It may be understood that in the present embodiment, the current target frame data may include one or two or more target frame data, and different target frame data are derived from different categories of sensing sensors. For example, in a specific application scenario, the current target frame data may include two target frame data, one target frame data is derived from an image acquisition sensor such as a camera, and the other target frame data is derived from a lidar.

Specifically speaking, on the basis of the embodiment shown in FIG. 1, if the current target frame data includes two or more target frame data and the two or more target frame data are derived from different categories of sensing sensors, as an implementation, the two or more target frame data may be merged to combine advantages of multiple categories of sensors to construct a high-precision map. At this time, a process of the obtaining a feature parameter corresponding to the feature object based on three-dimensional point cloud data corresponding to the feature object may include: merging three-dimensional point cloud data corresponding to a same feature object in the two or more target frame data; and obtaining the feature parameter corresponding to the feature object according to merged three-dimensional point cloud data corresponding to each feature object in the two or more target frame data.

For example, when the current target frame data include image data and lidar data, an object A corresponding to the image data and an object A' corresponding to the lidar data are a same object in the environment. If the object belongs to the feature object, three-dimensional point cloud data corresponding to the object A obtained based on the image data is merged with three-dimensional point cloud data corresponding to the object A' obtained based on the lidar data, and then the merged three-dimensional point cloud data is regarded as the three-dimensional point cloud data corresponding to the object. Similarly, when the current target frame data includes target frame data from three categories of different sensing sensors, if any two or three target frame data includes the same object, the merged three-dimensional point cloud data is regarded as the three-dimensional point cloud data corresponding to the object It needs to be noted that, in the above two or more target frame data, for the object only present in one target frame data but absent in other target frame data, the three-dimensional point cloud data corresponding to the object does not change after merging the two or more target frame data.

Certainly, as another implementation, the feature parameter corresponding to the feature object in each target frame data may be obtained respectively based on each target frame data; and then feature parameters corresponding to the same feature object in different target frame data may be fused to obtain an optimized feature parameter of the feature object. It needs to be noted that since the parameter extraction rules corresponding to the same feature object are the same, the feature parameters corresponding to the same feature object in different target frame data have the same category, and the values may be deviated.

In an implementation, a manner for fusing the feature parameters corresponding to the same feature object in different target frame data may be: obtaining an average value of the feature parameters corresponding to the same feature object in different target frame data, and regarding the average value as the optimized feature parameter of the feature object. Certainly, in addition to the manner of obtaining average value, the optimized feature parameter may also be obtained based on other feature parameter fusion manners, and it will not be limited herein. For example, a weight coefficient corresponding to each target frame data may be preset according to an actual application, and a sum of weight coefficients corresponding to each target frame data is 1. For the same feature object, products of the feature parameters obtained based on the corresponding target frame data and corresponding weight coefficients are accumulated, and an accumulated result is regarded as the optimized feature parameter.

Correspondingly, the adjusting a point cloud density of three-dimensional point cloud data corresponding to the non-feature object in the current target frame data to a preset value may include: adjusting the point cloud density of the three-dimensional point cloud data corresponding to the non-feature object in the two or more target frame data to the preset value, and merging three-dimensional point cloud data corresponding to a same non-feature object in the two or more target frame data. Certainly, in other embodiments of the present application, the three-dimensional point cloud data corresponding to the same non-feature object in the two or more target frame data may be merged firstly, and then the point cloud density of the merged three-dimensional point cloud data is adjusted to the preset value.

A fusion of data collected by multiple categories of sensors may combine advantages of multiple categories of sensors to construct a high-precision map, which makes map information more abundant and redundant, and makes the positioning function more robust.

On the basis of the embodiment shown in FIG. 1, the map construction method provided by an embodiment of the present application may further include: storing the feature parameter corresponding to the feature object and the three-dimensional point cloud data of which the point cloud density is adjusted corresponding to the non-feature object, so as to construct the map based on the feature parameter and the three-dimensional point cloud data stored. For example, a map database may be pre-built to store data for splicing the map, and after obtaining the map data, that is, feature parameter, corresponding to the current target frame data and the three-dimensional point cloud data of which the point cloud density is adjusted corresponding to the non-feature object, the map data corresponding to the current target frame data is added to the map database, so as to facilitate subsequent construction of the map according to the map data stored in the map database.

In the present embodiment, a manner of splicing the map may adopt a real-time splicing manner or an overall splicing manner, and it is specifically set according to actual needs.

The real-time splicing manner is to splice the map data corresponding to the current target frame data and map data corresponding to a target frame data preceding the current target frame data to obtain a target map, after obtaining the map data, namely, the feature parameter, corresponding to the current target frame data and the three-dimensional point cloud data after the resolution unification, until a whole map corresponding to an entire movement process is obtained after finishing splicing the map data obtained from a finally-obtained target frame data as the current target frame data in the entire movement process of the mobile device.

At this time, on the basis of the embodiment shown in FIG. 1, the map construction method provided by an embodiment of the present application may further include: splicing a the feature parameter and three-dimensional point cloud data corresponding to the current target frame data with previously-obtained data, to obtain a target map. The previously-obtained data is a feature parameter and three-dimensional point cloud data obtained within a target time period, and the target time period is a time period between a work start time and an obtaining time of the current target frame data. It may be understood that the work start time is a moment when the sensing sensor starts to collect the sensing data during the movement process of the mobile device, and the previously-obtained data includes map data corresponding to all the target frame data before the current target frame data in the current map construction process.

The overall splicing manner is to process each target frame data collected by the sensing sensor during the entire movement process of the mobile device firstly to obtain the map data corresponding to the each target frame data, and then splice the map data corresponding to the each target frame data to obtain a whole map corresponding to the entire movement process. For example, in a specific application scenario, the mobile device needs to construct a map for a target area, the target area includes a plurality of road segments, and the mobile device needs to pass through all road segments of the target area, obtain the map data corresponding to each target frame data collected by the sensing sensor in the process, and then splice these map data to obtain a map of the target area.

It needs to be noted that in the process of splicing the map, in order to further improve the accuracy of map construction, a BA (Bundle Adjustment) optimization may be performed on the feature parameter or the three-dimensional point cloud data of which the point cloud density is adjusted corresponding to the same object observed by different sensing sensors at different time to minimize a re-projection error.

In order to illustrate the technical solution provided by the embodiment of the present application more clearly, a specific application scenario is taken as an example for illustration.

In a specific application scenario, sensors on a mobile device such as a self-driving vehicle, a robot, and the like, are functionally classified into dimension sensors and sensing sensors. The dimension sensors include a RTK (Real-Time Kinematic), a GPS (Global Positioning System), an IMU (Inertial Measurement Unit), a wheel speed meter, and the like. The GPS and RTK are used to help the mobile device obtain absolute position information, and the IMU and wheel speed meter are used to obtain relative position information to correct position and orientation information. The sensing sensors include a lidar, a millimeter wave radar, a camera, or the like. Certainly, in order to improve the robustness of the system, a solution of fusing multiple sensing sensors may be adopted. It needs to be noted that the fusion of multiple sensors requires time synchronization and spatial synchronization of different sensors, that is, calibration and hardware synchronization of these sensors are required in advance.

After calibrating and hardware synchronizing the sensors of the mobile device, a position in a world coordinate system, that is, coordinate information corresponding to a preset base point may be obtained by obtaining the absolute position information and relative position information when the sensing sensors collect each target frame data. The relative position information may be obtained by a lidar, a visual odometry (VO), or a lidar integrated with the IMU or the wheel speed meter through EKF (Kalman filter), and a specific obtaining manner is not limited. The base point is set according to actual scenarios. For example, for a self-driving vehicle, a preset center point of the vehicle body may be regarded as the base point.

After obtaining the three-dimensional point cloud data corresponding to the observed objects in the current target frame data, in order to facilitate the subsequent construction of the map, the three-dimensional point cloud data corresponding to the current target frame data needs to be unified into a base point coordinate system, and a coordinate conversion of the three-dimensional point cloud data corresponding to the current target frame data needs to be performed based on a calibration parameter of the sensing sensor corresponding to the current target frame data.

It may be understood that the relative position T_sensorm_sensorn, that is, the calibration parameter, between different sensors and an external parameter T_base_sensorm of each sensor away from the base point may be obtained by calibrating. The base point is used to make sensing data obtained by all sensing sensors be unified into a relative coordinate system. The sensing data obtained by each sensing sensor may be unified into the base point coordinate system by rotating and translating by the external parameter or a combination of the calibration parameter and the external parameter. For example, for the point cloud data obtained by the lidar sensor, the point cloud data obtained by the lidar sensor may be transformed into the base point coordinate system by performing the following conversion: pointcloud_base=T_base_lidar*pointcloud_lidar. The T_base_lidar represents an external parameter of the lidar sensor away from the base point, and the pointcloud_lidar represents the point cloud data obtained by the lidar sensor. For another example, for point cloud data obtained by a camera, the point cloud data corresponding to image data collected by the camera may be transformed into the base point coordinate system by performing the following conversion: pointcloud_base=T_base_camera*pointcloud_camera. The T_base_camera represents an external parameter of the camera away from the base point, and the pointcloud_camera represents the point cloud data corresponding to the image data collected by the camera. In this way, the data collected by each sensing sensor may be unified into the base point coordinate system.

Thereafter, according to a position pose of the base point coordinate system corresponding to the current target frame data in the world coordinate system, a coordinate information of the three-dimensional point cloud data corresponding to the current target frame data in the world coordinate system may be obtained by multiplying the three-dimensional point cloud data corresponding to the current target frame data by the position pose of the base point coordinate system corresponding to the current target frame data in the world coordinate system.

Furthermore, the feature parameter corresponding to the feature object may be obtained based on the coordinate information in the world coordinate system of the three-dimensional point cloud data corresponding to the feature object in the current target frame data. The point cloud density of the three-dimensional point cloud data corresponding to the non-feature object in the current target frame data is adjusted to a preset value, and the coordinate information in the world coordinate system of the three-dimensional point cloud data of which the point cloud density is adjusted is obtained. Furthermore, the map is constructed based on the feature parameter corresponding to the feature object in the current target frame data and the coordinate information in the world coordinate system of the three-dimensional point cloud data after adjusting point cloud density.

In summary, the map construction method provided by the embodiment of the present application achieves the homogenization of the heterogeneous data collected by different categories of sensors by extracting the feature parameter of the feature object and adjusting the point cloud density of the point cloud data of the non-feature object, so that the method may be applied to map construction and positioning of different sensors without being limited to the categories of sensors.

Exemplary Apparatuses

Figure 3:
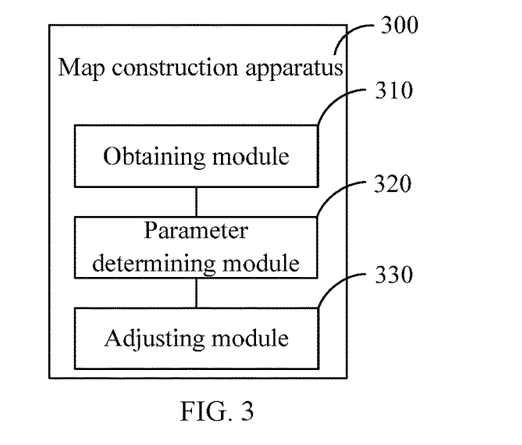
FIG. 3 is a block diagram of a map construction apparatus according to an exemplary embodiment of the present application.

FIG. 3 is a block diagram of a map construction apparatus according to an exemplary embodiment of the present application.

As shown in FIG. 3, the map construction apparatus 300 according to the embodiment of the present application includes: an obtaining module 310 configured to obtain three-dimensional point cloud data corresponding to observed objects in current target frame data, the observed objects including a feature object and a non-feature object; a parameter determining module 320 configured to obtain a feature parameter corresponding to the feature object based on three-dimensional point cloud data corresponding to the feature object, the feature parameter being used to indicate a position and a size of the feature object; and an adjusting module 330 configured to adjust a point cloud density of the three-dimensional point cloud data corresponding to the non-feature object to a preset value, to construct a map according to the feature parameter and the three-dimensional point cloud data of which the point cloud density is adjusted.

Figure 4:
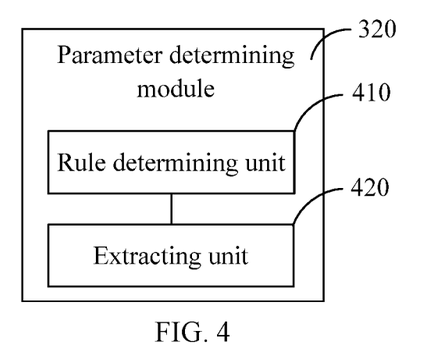
FIG. 4 is an example block diagram of a parameter determining module of a map construction apparatus according to an exemplary embodiment of the present application.

FIG. 4 is an exemplary block diagram of a parameter determining module of a map construction apparatus according to an exemplary embodiment of the present application. As shown in FIG. 4, in an example, the parameter determining module 320 may include: a rule determining unit 410 configured to determine a parameter extraction rule corresponding to the feature object based on a preset rule information base, the rule information base storing mapping relationship information of multiple categories of feature objects and corresponding parameter extraction rules; and an extracting unit 420 configured to obtain the feature parameter corresponding to the feature object based on the three-dimensional point cloud data and the parameter extraction rule corresponding to the feature object.

In an example, the extracting unit 420 includes: an expression determining subunit configured to determine a structured expression corresponding to the feature object; a parameter fitting subunit configured to perform parameter fitting for the structured expression corresponding to the feature object based on the three-dimensional point cloud data corresponding to the feature object, to obtain a structured parameter corresponding to the feature object; and a parameter obtaining subunit configured to obtain the feature parameter corresponding to the feature object based on the structured parameter.

In an example, the parameter obtaining subunit is configured to obtain a position parameter of the feature object according to the three-dimensional point cloud data corresponding to the feature object, the position parameters being used to characterize a position of the feature object; and regard the structured parameter and the position parameter as the feature parameter corresponding to the feature object.

In an example, the current target frame data includes two or more target frame data, and the two or more target frame data are derived from different categories of sensing sensors. At this time, the parameter determining parameter 320 is configured to merge three-dimensional point cloud data corresponding to a same feature object in the two or more target frame data; and obtain the feature parameter corresponding to the feature object according to merged three-dimensional point cloud data corresponding to each feature object in the two or more target frame data.

Correspondingly, the adjusting module 330 is configured to adjust the point cloud density of the three-dimensional point cloud data corresponding to the non-feature object in the two or more target frame data to the preset value, and merge three-dimensional point cloud data corresponding to a same non-feature object in the two or more target frame data.

In an example, the map construction apparatus 300 according to an embodiment of the present application further includes: a category determining module configured to determine a category of each object in the current target frame data; and an identifying module configured to match the category of the object with an object category in a preset category information base, determine a successfully-matched object as the feature object, and determine an unsuccessfully-matched object as the non-feature object. The category information base stores multiple object categories.

In an example, the adjusting module 330 is configured to downsample the three-dimensional point cloud data corresponding to the non-feature object in the current target frame data by a preset voxel grid, and adjust the point cloud density of the three-dimensional point cloud data corresponding to the non-feature object to the preset value.

In an example, the map construction apparatus 300 according to an embodiment of the present application further includes: a storing module configured to store the feature parameter corresponding to the feature object and the three-dimensional point cloud data of which the point cloud density is adjusted corresponding to the non-feature object, so as to construct the map based on the feature parameter and the three-dimensional point cloud data stored.

In an example, the map construction apparatus 300 according to an embodiment of the present application further includes: a map splicing module configured to splice a feature parameter and three-dimensional point cloud data corresponding to the current target frame data with previously-obtained data, to obtain a target map. The previously-obtained data is a feature parameter and three-dimensional point cloud data obtained within a target time period, and the target time period is a time period between a work start time and an obtaining time of the current target frame data.

Herein, those skilled in the art may understand that specific functions and operations of the respective modules in the map construction apparatus 300 have been described in detail in the above description of the map construction method with reference to FIG. 1 and FIG. 2. Therefore, the repeated description thereof is omitted herein.

As described above, the map construction apparatus 300 according to an embodiment of the present application may be implemented in device terminals of various mobile devices, such as computers or microprocessors used in self-driving vehicles, robots, and the like. In an example, the map construction apparatus 300 according to an embodiment of the present application may be integrated into a device terminal of the mobile device as a software module and/or a hardware module. For example, the map construction apparatus 300 may be a software module in an operating system of the device terminal, or an application developed for the device terminal. Certainly, the map construction apparatus 300 may also be one of many hardware modules of the device terminal.

Alternatively, in another example, the map construction apparatus 300 and the device terminal of the mobile device may also be separate devices, and the map construction apparatus 300 may be connected to the device terminal through a wired and/or wireless network, and transmit interactive information in an agreed data format.

Exemplary Electronic Devices

Hereinafter, an electronic device according to an embodiment of the present application is described with reference to FIG. 5.

Figure 5:
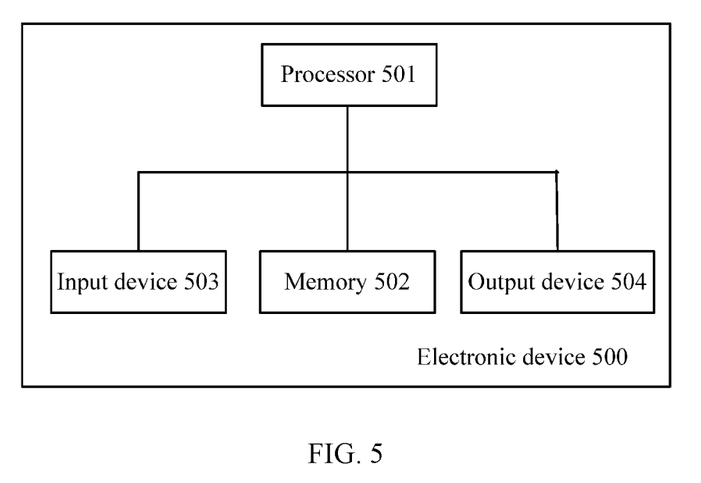
FIG. 5 is a schematic structural diagram of an electronic device according to an exemplary embodiment of the present application.

FIG. 5 is a block diagram of an electronic device according to an embodiment of the present application.

As shown in FIG. 5, an electronic device 500 includes one or more processors 501 and a memory 502.

A processor 501 may be a Central Processing Unit (CPU) or a processing unit which is in other forms and has a data processing capability and/or an instruction execution capability, and may control other components in the electronic device 500 to perform desired functions.

The memory 502 may include one or more computer program products which may include various forms of computer readable storage medium, such as a volatile memory and/or a nonvolatile memory. The volatile memory may include, for example, a Random Access Memory (RAM) and/or a cache, or the like. The nonvolatile memory may include, for example, a Read-Only Memory (ROM), a hard disk, a flash memory, and the like. One or more computer program instructions may be stored in the computer readable storage medium, and the processor 501 may run the program instructions to implement the map construction method and/or other desired functions of various embodiments of the present application described above. Various contents such as an input signal, a signal component, a noise component and the like may also be stored in the computer readable storage medium.

In an example, the electronic device 500 may further include an input device 503 and an output device 504 that are interconnected by a bus system and/or a connection mechanism in other forms (not shown).

The input device 503 may further include, for example, a keyboard, a mouse and the like.

The output device 504 may output various information to the outside, including determined distance information, direction information, and the like. The output device 504 may include, for example, a display, a speaker, a printer, a communication network and a remote output device which is connected to the communication network, and the like.

Certainly, for the sake of simplicity, only some of the components of the electronic device 500 related to the present application are shown in FIG. 5, and components such as a bus, an input/output interface, and the like are omitted. In addition, the electronic device 500 may further include any other suitable components according to specific application situations.

Exemplary Computer Program Products and Computer Readable Storage Media

In addition to the method and device described above, embodiments of the present application may also be a computer program product including computer program instructions that, when executed by a processor, cause the processor to perform the steps in the map construction method according to various embodiments of the present application as described in the above section "Exemplary Methods" of the present specification.

The computer program product may program a program code for performing the operations of the embodiments of the present application in any combination of one or more programming languages. The programming language includes an object-oriented programming language, such as Java, C++, and the like, and further includes a conventional procedural programming language, such as "C" language or similar programming languages. The program code may be executed entirely on a user computing device, be executed partially on a user device, be executed as a separate software package, be executed partially on the user computing device and partially on a remote computing device, or be executed entirely on the remote computing device or a server.

In addition, embodiments of the present application may also be a computer readable storage medium storing computer program instructions that, when executed by a processor, cause the processor to perform the steps in the map construction method according to various embodiments of the present application as described in the above section "Exemplary Methods" of the present specification.

The computer readable storage medium may adopt any combination of one or more readable medium. The readable medium may be a readable signal medium or a readable storage medium. The readable storage medium may include, but not limited to, for example, electronic, magnetic, optical, electromagnetic, infrared or a semiconductor system, apparatus or device, or any combinations of the above. More specific examples (non-exhaustive list) of the readable storage medium may include an electrical connection having one or more wires, a portable disk, a hard disk, a Random Access Memory (RAM), a Read-Only Memory (ROM), an Erasable Programmable Read-Only Memory (EPROM or a Flash memory), an optical fiber, a Portable Compact Disc Read-Only Memory (CD-ROM), an optical storage device, a magnetic storage device, or any suitable combination of the above.

The basic principles of the present application have been described above in connection with specific embodiments. However, it needs to be noted that merits, advantages, effects, and the like mentioned in the present application are merely exemplary and not restrictive, and the merits, advantages, effects, and the like are not considered to be requisite in embodiments of the present application. In addition, the specific details of the above application are only for the purpose of illustration and ease of understanding, and are not for a limiting purpose. The above details do not limit the present application must be implemented with the above specific details.

The block diagrams of components, apparatuses, devices and systems mentioned in the present application are merely exemplary examples, and not intended to require or imply that connection, arrangement and configuration must be performed in the manners shown in the block diagrams. As will be appreciated by those skilled in the art, these components, apparatus, devices and systems may be connected, arranged, and configured in any manner. Words such as "including", "comprising", "having", and the like are open-ended words, referring to "including but not limited to", and may be used therewith interchangeably. The word "or" and "and" used herein refer to a word "and/or", and may be used therewith interchangeably unless the context indicates otherwise clearly. The word "such as" used herein refers to a phrase "such as but not limited to", and may be used therewith interchangeably.

It needs to be noted that in the devices, apparatuses and methods of the present application, various components or steps may be divided and/or re-combined. These divisions and/or re-combinations should be considered as equivalent solutions of the present application.

The above description of the disclosed aspects is provided to enable any person skilled in the art to make or use the present application. Various modifications to these aspects are obvious to those skilled in the art, and the general principles defined herein may be applied to other aspects without departing from the scope of the application. Therefore, the present application is not intended to be limited to the aspects shown herein, but covers the broadest scope consistent with the principles and novel features disclosed herein.

The foregoing description has been presented for purposes of illustration and description. In addition, the description is not intended to limit the embodiments of the present application to the forms disclosed herein. Although multiple example aspects and embodiments have been discussed above, those skilled in the art will recognize certain variations, modifications, changes, additions and sub-combinations thereof

What is claimed is:

1. A map construction method, comprising:
    obtaining three-dimensional point cloud data corresponding to observed objects in current target frame data, the observed objects comprising a feature object and a non-feature object;
    obtaining a feature parameter corresponding to the feature object based on three-dimensional point cloud data corresponding to the feature object, the feature parameter being used to indicate a position and a size of the feature object; and
    adjusting a point cloud density of three-dimensional point cloud data corresponding to the non-feature object to be reduced to a preset value by downsampling the three-dimensional point cloud data, and constructing a map according to the feature parameter and the three-dimensional point cloud data of which the point cloud density is adjusted.

2. The method of claim 1, wherein the obtaining a feature parameter corresponding to the feature object based on three-dimensional point cloud data corresponding to the feature object comprises:
    determining a parameter extraction rule corresponding to the feature object based on a preset rule information base, the rule information base storing mapping relationship information between multiple categories of feature objects and corresponding parameter extraction rules; and
    obtaining the feature parameter corresponding to the feature object based on the three-dimensional point cloud data and the parameter extraction rule corresponding to the feature object.

3. The method of claim 2, wherein the obtaining the feature parameter corresponding to the feature object based on the three-dimensional point cloud data and the parameter extraction rule corresponding to the feature object comprises:
    determining a structured expression corresponding to the feature object;
    performing parameter fitting for the structured expression corresponding to the feature object based on the three-dimensional point cloud data corresponding to the feature object, to obtain a structured parameter corresponding to the feature object; and
    obtaining the feature parameter corresponding to the feature object based on the structured parameter.

4. The method of claim 3, wherein the obtaining the feature parameter corresponding to the feature object based on the structured parameter comprises:
    obtaining a position parameter of the feature object according to the three-dimensional point cloud data corresponding to the feature object, the position parameter being used to indicate a position of the feature object; and
    regarding the structured parameter and the position parameter as the feature parameter corresponding to the feature object.

5. The method of claim 1, wherein the current target frame data comprises two or more target frame data, and the two or more target frame data are derived from different categories of sensing sensors,
    wherein the obtaining a feature parameter corresponding to the feature object based on three-dimensional point cloud data corresponding to the feature object comprises:
    merging three-dimensional point cloud data corresponding to a same feature object in the two or more target frame data; and
    obtaining the feature parameter corresponding to the feature object according to merged three-dimensional point cloud data corresponding to each feature object in the two or more target frame data.

6. The method of claim 5, wherein the adjusting a point cloud density of three-dimensional point cloud data corresponding to the non-feature object to be reduced to a preset value by downsampling the three-dimensional point cloud data comprises:

adjusting the point cloud density of the three-dimensional point cloud data corresponding to the non-feature object in the two or more target frame data to be reduced to the preset value by downsampling the three-dimensional point cloud data, and merging three-dimensional point cloud data corresponding to a same non-feature object in the two or more target frame data.

7. The method of claim 1, wherein before the obtaining a feature parameter corresponding to the feature object based on three-dimensional point cloud data corresponding to the feature object, the method further comprises:

determining a category of each object in the current target frame data; and matching the category of the object with an object category in a preset category information base, determining a successfully-matched object as the feature object, and determining an unsuccessfully-matched object as the non-feature object, wherein the category information base stores multiple object categories.

8. The method of claim 1, wherein the adjusting a point cloud density of three-dimensional point cloud data corresponding to the non-feature object to be reduced to a preset value by downsampling the three-dimensional point cloud data comprises:

adjusting, by downsampling the three-dimensional point cloud data corresponding to the non-feature object in the current target frame data by a preset voxel grid, the point cloud density of the three-dimensional point cloud data corresponding to the non-feature object to the preset value.

9. The method of claim 1, wherein after the adjusting a point cloud density of three-dimensional point cloud data corresponding to the non-feature object to be reduced to a preset value by downsampling the three-dimensional point cloud data, the method further comprises:

storing the feature parameter corresponding to the feature object and the three-dimensional point cloud data of which the point cloud density is adjusted corresponding to the non-feature object, and constructing the map based on the feature parameter and the three-dimensional point cloud data stored.

10. The method of claim 1, wherein after the adjusting a point cloud density of three-dimensional point cloud data corresponding to the non-feature object to be reduced to a preset value by downsampling the three-dimensional point cloud data, the method further comprises:

splicing a feature parameter and three-dimensional point cloud data corresponding to the current target frame data with previously-obtained data, to obtain a target map, wherein the previously-obtained data is a feature parameter and three-dimensional point cloud data obtained within a target time period, and the target time period is a time period between a work start time and an obtaining time of the current target frame data.

11. An electronic device, comprising:
a processor; and
a memory for storing instructions executable by the processor;
wherein the processor is configured to perform a map construction method, comprising:

obtaining three-dimensional point cloud data corresponding to observed objects in current target frame data, the observed objects comprising a feature object and a non-feature object;

obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to be reduced to a preset value by downsampling the three-dimensional point cloud data, and constructing a map according to the feature parameter and the three-dimensional point cloud data of which the point cloud density is adjusted.

12. The electronic device of claim 11, wherein the obtaining a feature parameter corresponding to the feature object based on three-dimensional point cloud data corresponding to the feature object comprises:

determining a parameter extraction rule corresponding to the feature object based on a preset rule information base, the rule information base storing mapping relationship information between multiple categories of feature objects and corresponding parameter extraction rules; and obtaining the feature parameter corresponding to the feature object based on the three-dimensional point cloud data and the parameter extraction rule corresponding to the feature object.

13. The electronic device of claim 12, wherein the obtaining the feature parameter corresponding to the feature object based on the three-dimensional point cloud data and the parameter extraction rule corresponding to the feature object comprises:

determining a structured expression corresponding to the feature object;

performing parameter fitting for the structured expression corresponding to the feature object based on the three-dimensional point cloud data corresponding to the feature object, to obtain a structured parameter corresponding to the feature object; and obtaining the feature parameter corresponding to the feature object based on the structured parameter.

14. The electronic device of claim 13, wherein the obtaining the feature parameter corresponding to the feature object based on the structured parameter comprises:

obtaining a position parameter of the feature object according to the three-dimensional point cloud data corresponding to the feature object, the position parameter being used to indicate a position of the feature object; and regarding the structured parameter and the position parameter as the feature parameter corresponding to the feature object.

15. The electronic device of claim 11, wherein the current target frame data comprises two or more target frame data, and the two or more target frame data are derived from different categories of sensing sensors, wherein the obtaining a feature parameter corresponding to the feature object based on three-dimensional point cloud data corresponding to the feature object comprises:

merging three-dimensional point cloud data corresponding to a same feature object in the two or more target frame data; and obtaining the feature parameter corresponding to the feature object according to merged three-dimensional point cloud data corresponding to each feature object in the two or more target frame data.

16. The electronic device of claim 15, wherein the adjusting a point cloud density of three-dimensional point cloud data corresponding to the non-feature object to be reduced to a preset value by downsampling the three-dimensional point cloud data comprises:

adjusting the point cloud density of the three-dimensional point cloud data corresponding to the non-feature object in the two or more target frame data to be reduced to the preset value by downsampling the three-dimensional point cloud data, and merging three-dimensional point cloud data corresponding to a same non-feature object in the two or more target frame data.

17. The electronic device of claim 11, wherein before the obtaining a feature parameter corresponding to the feature object based on three-dimensional point cloud data corresponding to the feature object, the method further comprises:

determining a category of each object in the current target frame data; and matching the category of the object with an object category in a preset category information base, determining a successfully-matched object as the feature object, and determining an unsuccessfully-matched object as the non-feature object, wherein the category information base stores multiple object categories.

18. The electronic device of claim 11, wherein the adjusting a point cloud density of three-dimensional point cloud data corresponding to the non-feature object to be reduced to a preset value by downsampling the three-dimensional point cloud data comprises:

adjusting, by downsampling the three-dimensional point cloud data corresponding to the non-feature object in the current target frame data by a preset voxel grid, the point cloud density of the three-dimensional point cloud data corresponding to the non-feature object to the preset value.

19. The electronic device of claim 11, wherein after the adjusting a point cloud density of three-dimensional point cloud data corresponding to the non-feature object to be reduced to a preset value by downsampling the three-dimensional point cloud data, the method further comprises:

storing the feature parameter corresponding to the feature object and the three-dimensional point cloud data of which the point cloud density is adjusted corresponding to the non-feature object, and constructing the map based on the feature parameter and the three-dimensional point cloud data stored.

20. A non-transitory computer readable storage medium storing a computer program configured to perform a map construction method, comprising:

obtaining three-dimensional point cloud data corresponding to observed objects in current target frame data, the observed objects comprising a feature object and a non-feature object;

obtaining a feature parameter corresponding to the feature object based on three-dimensional point cloud data corresponding to the feature object, the feature parameter being used to indicate a position and a size of the feature object; and adjusting a point cloud density of three-dimensional point cloud data corresponding to the non-feature object to be reduced to a preset value by downsampling the three-dimensional point cloud data, and constructing a map according to the feature parameter and the three-dimensional point cloud data of which the point cloud density is adjusted.

* * * * *